US011656690B2

(12) United States Patent
Qian et al.

(10) Patent No.: US 11,656,690 B2
(45) Date of Patent: May 23, 2023

(54) USER INPUT AND VIRTUAL TOUCH PAD IN AUGMENTED REALITY FOR USE IN SURGICAL SETTINGS

(71) Applicant: Medivis, Inc., New York, NY (US)

(72) Inventors: Long Qian, Brooklyn, NY (US); Wenbo Lan, Brooklyn, NY (US); Christopher Morley, New York, NY (US); Osamah Choudhry, New York, NY (US)

(73) Assignee: Medivis, Inc., New York, NY (US)

( * ) Notice: Subject to any disclaimer, the term of this patent is extended or adjusted under 35 U.S.C. 154(b) by 0 days.

(21) Appl. No.: 17/723,437

(22) Filed: Apr. 18, 2022

(65) Prior Publication Data

US 2022/0283647 A1   Sep. 8, 2022

Related U.S. Application Data

(63) Continuation-in-part of application No. 17/194,191, filed on Mar. 5, 2021, now Pat. No. 11,307,653.

(51) Int. Cl.
*G06F 3/01* (2006.01)
*G06T 19/00* (2011.01)
*G06F 3/04845* (2022.01)
*G06F 3/04815* (2022.01)

(52) U.S. Cl.
CPC .......... *G06F 3/017* (2013.01); *G06F 3/04815* (2013.01); *G06F 3/04845* (2013.01); *G06T 19/006* (2013.01); *G06T 2210/41* (2013.01)

(58) Field of Classification Search
CPC .. G06F 3/017; G06F 3/04815; G06F 3/04845; G06T 19/006; G06T 2210/41
See application file for complete search history.

(56) References Cited

U.S. PATENT DOCUMENTS 6,126,450 A * 10/2000 Mukai .................... G09B 23/28
434/262
7,743,348 B2 * 6/2010 Robbins .............. G06F 3/04845
715/767
8,330,733 B2 * 12/2012 Petschnigg ........... G06F 3/0486
345/173

(Continued)

*Primary Examiner* — Grant Sitta
(74) *Attorney, Agent, or Firm* — Cognition IP, P.C.; Edward Steakley; Rajesh Fotedar

(57) ABSTRACT

Various embodiments of an apparatus, methods, systems and computer program products described herein are directed to an Interaction Engine. According to various embodiments, the Interaction Engine generates, within a unified three-dimensional (3D) coordinate space: a virtual 3D medical model positioned according to a current model pose and at least one a virtual 3D hand representation. The Interaction Engine renders an AR display that includes display of the virtual 3D medical model positioned according to the current model pose and the virtual 3D hand representation. The Interaction Engine identifies selection of a slate virtual interaction based on the type of movement of the virtual 3D hand representation. The Interaction Engine modifies the AR display by rendering a virtual slate concurrently displayed with the virtual 3D medical model. The Interaction Engine adjusts the display of the virtual 3D medical model based at least on subsequent physical gestures with respect to the virtual slate.

18 Claims, 18 Drawing Sheets

(56) References Cited

U.S. PATENT DOCUMENTS

| | | | |
|---|---|---|---|
| 8,601,394 B2* | 12/2013 | Sheehan | G06F 3/03547 |
| | | | 715/834 |
| 8,633,924 B2* | 1/2014 | Davidson | G06F 3/04883 |
| | | | 345/163 |
| 8,633,934 B2* | 1/2014 | Cao | G06F 3/04845 |
| | | | 396/545 |
| 10,872,460 B1 | 12/2020 | Luo et al. | |
| 11,086,475 B1* | 8/2021 | Ravasz | G06F 3/011 |
| 11,145,135 B1* | 10/2021 | Ng | G06F 3/04817 |
| 11,307,653 B1* | 4/2022 | Qian | G06F 3/012 |
| 2006/0026535 A1* | 2/2006 | Hotelling | G06F 3/0488 |
| | | | 715/863 |
| 2010/0199232 A1* | 8/2010 | Mistry | G06F 3/0426 |
| | | | 715/863 |
| 2011/0107270 A1* | 5/2011 | Wang | G16H 20/40 |
| | | | 703/11 |
| 2015/0153951 A1* | 6/2015 | Kim | G06F 3/0488 |
| | | | 715/773 |
| 2015/0269783 A1* | 9/2015 | Yun | G02B 27/0172 |
| | | | 345/633 |
| 2018/0157398 A1* | 6/2018 | Kaehler | G06T 19/006 |
| 2020/0054398 A1 | 2/2020 | Kovtun et al. | |
| 2020/0105070 A1* | 4/2020 | Coustaud | G06T 7/0012 |
| 2020/0138518 A1* | 5/2020 | Lang | A61B 5/05 |
| 2021/0166486 A1 | 6/2021 | Kim et al. | |
| 2021/0191600 A1* | 6/2021 | Lemay | G06F 3/0304 |

* cited by examiner

USER INPUT AND VIRTUAL TOUCH PAD IN AUGMENTED REALITY FOR USE IN SURGICAL SETTINGS

CROSS-REFERENCE TO RELATED APPLICATIONS

This application is a continuation-in-part of U.S. patent application Ser. No. 17/194,191, filed on Mar. 5, 2021, titled "USER INPUT AND INTERFACE DESIGN IN AUGMENTED REALITY FOR USE IN SURGICAL SETTINGS," the entirety of which is incorporated herein by reference.

BACKGROUND

Conventional systems provide for the rendering of virtual reality and augmented reality environments. Such environments provide a visualization of various portions of the physical world as well as simulations of certain events that will or may occur in the physical world. These conventional systems include communication with input devices controlled by one or more users. The input devices allow the users to select certain types of actions and activities within the rendered environments. In many cases, these environments rendered by conventional systems may be specific to certain types of industries. For example, some conventional virtual reality environments may be used to simulate training situations for a type of worker with duties specific to an occupation. In another example, some conventional virtual reality environments may be used to model future events and visualize the occurrence and effects of the modeled future events on a particular physical geographical location.

SUMMARY

Conventional systems for three-dimensional (3D) visualization lack a certain types of functionalities that allow a user(s) to interact and manipulate rendered objects by physical gestures. Various embodiments of the Interaction Engine described herein provide significant improvements of the limitations of conventional systems by providing and implementing various types of virtual interactions. The Interaction Engine tracks a user's movements in the physical world and represents such movements as virtual interactions rendered within a unified 3D coordinate space. Such virtual interactions may result in movement and manipulation of rendered objects in a 3D display. Such virtual interactions may further result in changes to display positions of the rendered objects that trigger portrayal in the 3D display of different types of visual data.

Various embodiments of an apparatus, methods, systems and computer program products described herein are directed to an Interaction Engine. According to various embodiments, the Interaction Engine implements various virtual interactions related to a 3D virtual slate.

In some embodiments, the 3D virtual slate is a an Augmented Reality (AR) virtual touchpad or an AR virtual trackpad.

According to various embodiments, the Interaction Engine may implement a windowing slate virtual interaction, a brightness slate virtual interaction, a clipping plane slate virtual interaction and/or an opacity virtual slate interactions. It is understand that other types of slate virtual interactions are contemplated based on the embodiments described herein.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
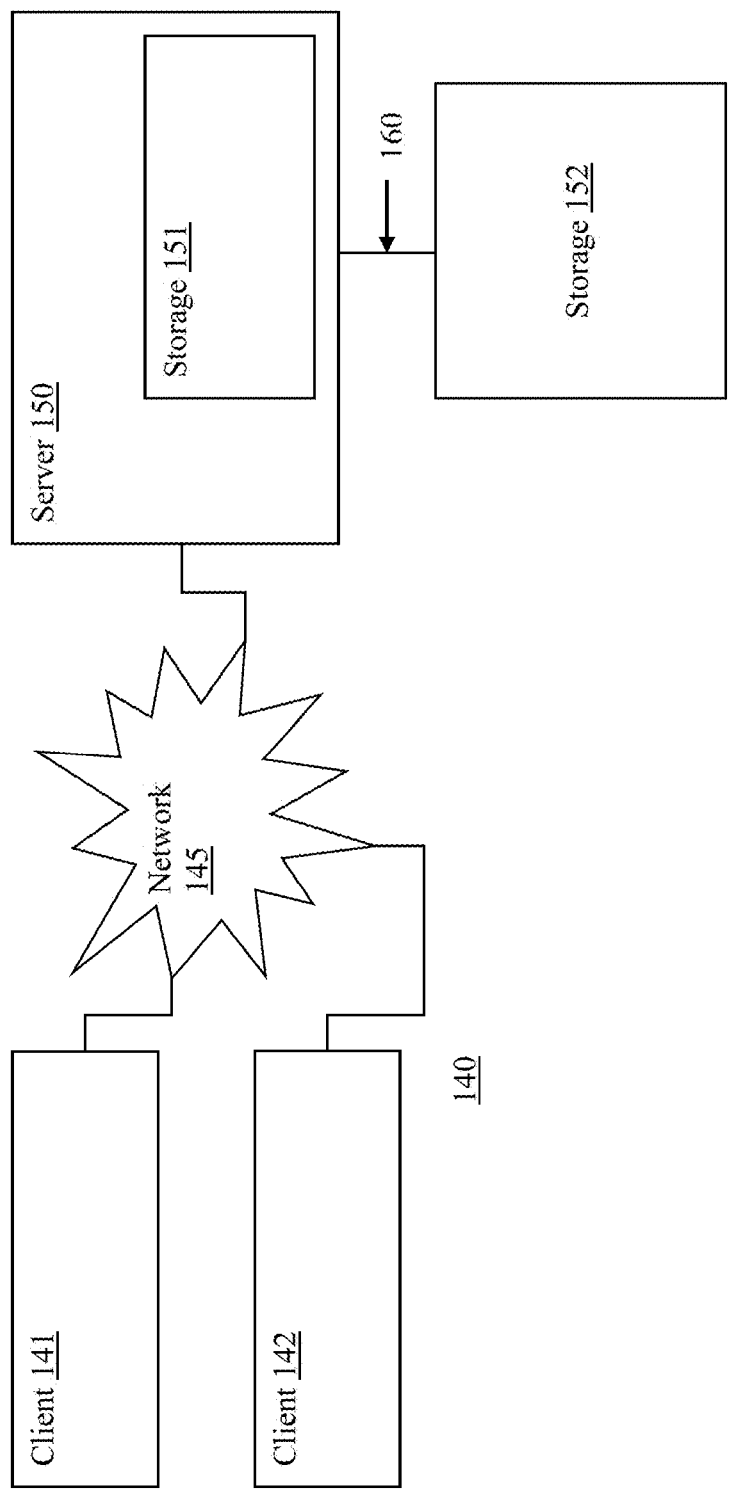
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method AR display 250 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
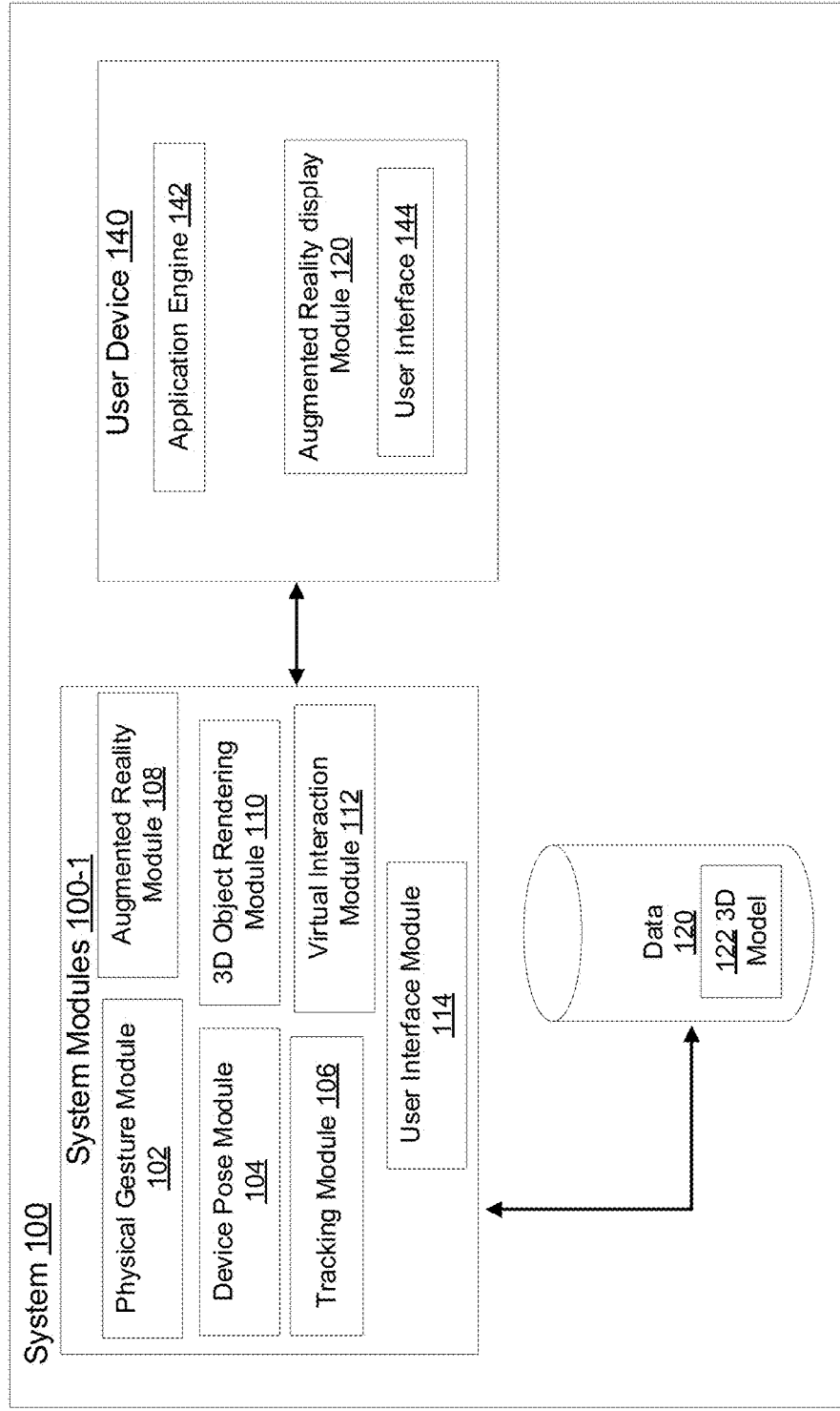
FIG. 1B is a diagram illustrating an exemplary environment in which some embodiments may operate.

FIG. 1B illustrates a block diagram of an example system 100 for an Interaction Engine that includes a physical gesture module 102, a device pose module 104, a tracking module 106, a an AR module 108, a 3D object rendering module 110, a virtual interaction module 112 and a user interface module 114. The system 100 may communicate with a user device 140 to display output, via a user interface 144 generated by an application engine 142. In various embodiments, the user device 140 may be an AR display headset device that further includes one or more of the respective modules 102, 104, 106, 108, 110, 112, 114.

The physical gesture module 102 of the system 100 may perform functionality, steps, operations, commands and/or instructions as illustrated in FIGS. 2, 3, 4, 5A, 5B, 6, 7A, 7B, 8A, 8B, 8C, 9A, 9B, 9C, 10A, 10B & 10C ("FIGS. 2-10C").

The device pose module 104 of the system 100 may perform functionality, steps, operations, commands and/or instructions as illustrated in FIGS. 2-10C.

The tracking module 106 of the system 100 may perform functionality, steps, operations, commands and/or instructions as illustrated in FIGS. 2-10C.

The augmented reality module 108 of the system 100 may perform functionality, steps, operations, commands and/or instructions as illustrated in FIGS. 2-10C.

The 3D object rendering module 110 of the system 100 may perform functionality, steps, operations, commands and/or instructions as illustrated in FIGS. 2-10C.

The virtual interaction module 112 of the system 100 may perform functionality, steps, operations, commands and/or instructions as illustrated in FIGS. 2-10C.

The user interface module 114 of the system 100 may perform functionality, steps, operations, commands and/or instructions as illustrated in FIGS. 2-10C.

A database 120 associated with the system 100 maintains information, such as 3D medical model data 122, in a manner the promotes retrieval and storage efficiency and/or data security. In addition, the model data 122 may include rendering parameters, such as data based on selections and modifications to a 3D virtual representation of a medical model rendered for a previous Augmented Reality display. In various embodiments, one or more rendering parameters may be preloaded as a default value for our rendering parameter in a newly initiated session of the Interaction Engine.

According to various embodiments, a user may wear an Augmented-Reality (AR) headset device that displays an AR display 250. According to various embodiments, the AR headset device may implement one or more modules of the Interaction Engine. The Interaction Engine generates an AR display 250, a 3D virtual representation of a medical model container, a 3D virtual representation of a medical model 300 ("3D virtual medical model"), and/or a 3D virtual representation of a body part of the user ("3D virtual hands").

In various embodiments, the Interaction Engine accesses one or more storage locations that contain respective portions of 3D medical model data. The 3D medical model data may include a plurality of slice layers of medical data associated with external and internal anatomies. For example, the 3D medical model data may include a plurality of slice layers that of medical data for illustrating external and internal anatomical regions of a user's head, brain and skull. It is understood that various embodiments may be directed to generating displays of any internal or external anatomical portions of the human body and/or animal bodies.

The Interaction Engine renders the 3D virtual medical model in the AR display based on the 3D medical model data. In addition, the Interaction Engine renders the 3D virtual medical model on model pose data which describes an orientation and position of the rendering of the medical model. The Interaction Engine applies the model pose data to the 3D medical model data to determine one or more positional coordinates in the unified 3D coordinate system for portion of model data of each slice layer.

The Interaction Engine further renders the 3D virtual medical model based on a current device pose of an AR headset device worn by the user. The current device pose represents a current position and orientation of the AR headset device in the physical world. The Interaction Engine translates the current device pose to a position and orientation within the unified 3D coordinate system to determine the user's perspective view of the AR display. The Interaction Engine generates a rendering of the 3D virtual medical model according to the model pose data for display to the user in the AR display according to the user's perspective view.

Various embodiments described herein provide a selection functionality for selection of various types of display AR virtual objects, components and/or the tool based on directional data associated with the 3D virtual hands. For example, the Interaction Engine tracks the user's hands via one or more tracking algorithms to determine hand direction(s) to further be utilized in determining whether one or more hand gestures performed by the user indicate selection of one or more AR virtual objects, components and/or one or more types of functionalities accessible via the AR display. For example, the Interaction Engine may track the user's hands and determine respective positions and changing positions of one or more hand joints. In various embodiments, the Interaction Engine may implement a simultaneous localization and mapping (SLAM) algorithm.

The Interaction Engine may generate direction data (or directional data) based at least in part on average distances between the user's palm and the user's fingers and/or hand joints. In some embodiments, the Interaction Engine generates direction data based on detected directional movement of the an AR headset device worn by the user. The Interaction Engine determines that the direction data indicates a position and orientation of the user's hands indicates a portion of an AR virtual object, component, one or more types of functionalities and/or the 3D virtual medical model with which the user seeks to select and/or virtually interact with.

According to various embodiments, the Interaction Engine may implement a collision algorithm to determine an AR virtual object, component, one or more types of functionalities and/or a portion of the 3D virtual medical model the user seeks to select and/or virtually interact with. For example, the Interaction Engine may track the user's hands and display the 3D virtual hands in the AR display according to respective positional coordinates in the unified 3D coordinate system that correspond to the orientation of the user's hands in the physical world.

The Interaction Engine may detect that one or more positional coordinates for displaying the 3D virtual hands in the AR display may overlap (or be the same as) one or more positional coordinates for displaying an AR virtual object, component, one or more types of functionalities (such as, for example, performance of various types of virtual interactions) and/or the portion of the 3D virtual medical model. In response to detecting the overlap, the Interaction Engine may determine that the user seeks to select and/or virtually interact with the corresponding AR virtual object, component, one or more types of functionalities and/or the portion of the 3D virtual medical model.

According to various embodiments, upon determining the user seeks to select and/or virtually interact with an AR virtual object, component, one or more types of functionalities and/or the portion of the 3D virtual medical model, the Interaction Engine may detect one or more changes in hand joint positions and identify the occurrence of the changes in hand joint positions as a performed selection function and/or a virtual interaction.

According to various embodiments, the Interaction Engine detects physical gestures performed by the user. In various embodiments, the Interaction Engine may include one or more cameras or sensors for visually tracking the user's physical hand movements and respective positions of the user's hands and current/updated positions of one or more of the user's hand joints. For example, the one or more cameras may be disposed on the AR headset device. In various embodiments, the Interaction Engine may further receive head pose tracking data and/or eye tracking data from the AR headset device worn by the user. The Interaction Engine may generate direction data (i.e. directional data) or augment direction data based at least in part on the head pose data and/or the eye tracking data. For example, the head pose tracking data may be based on a position(s) and orientation(s) of the AR headset device in the physical world as the user moves the user's head. For example, the eye tracking data may be based on data generated by one or more cameras or sensors on the AR headset device directed at the user's eyes in order to track movements of one or more portions of the user's eyes and changes of positions of those one or more portions of the user's eyes.

Figure 2:
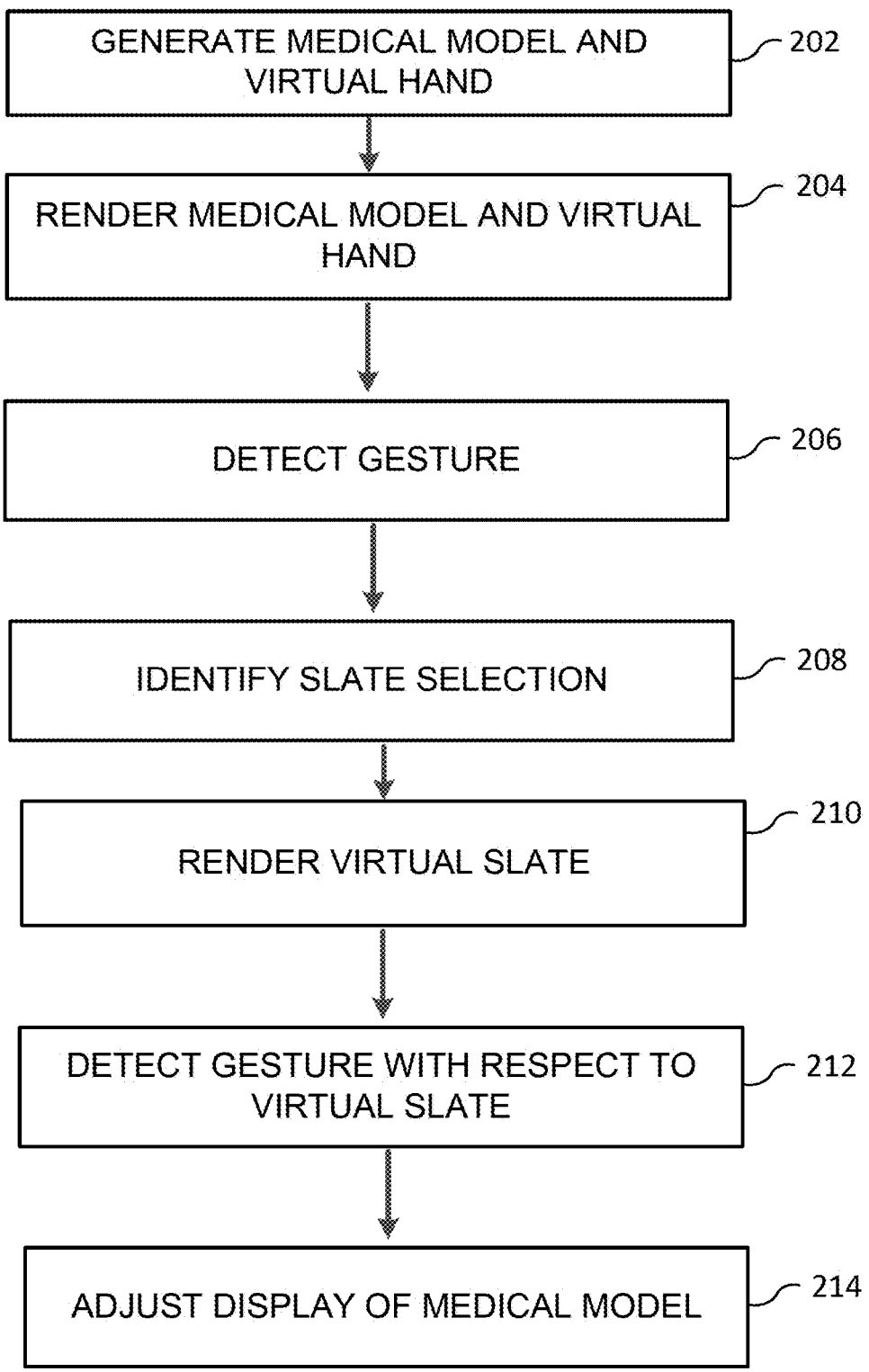
FIG. 2 is a diagram illustrating an exemplary method that may be performed in some embodiments.

As shown in flowchart 200 of FIG. 2, the Interaction Engine generates the virtual medical model positioned according to a current model pose and the 3D virtual hand(s). (Act 202)

The Interaction Engine renders an AR display, via the AR headset device, that includes concurrent display of the 3D virtual medical model 300 and the 3D virtual hands. (Act 204) In various embodiments, the AR display is rendered by the Interaction Engine according to a unified 3D coordinate system which defines multiple respective coordinate positions for concurrent placement and display of one or more rendered objects. In various embodiments, the Interaction Engine may determine (and update) a display position for the 3D virtual hands in the AR display 250 according to the unified 3D coordinate system based at least on the received sensor data.

The Interaction Engine detects a physical gesture(s). (Act 206) In various embodiments, the Interaction Engine identifies a virtual interaction selected by the user, or to be performed by the user, based on selection of one or more functionalities from a menu displayed in the AR display.

The Interaction Engine identifies a slate virtual interaction based on the type of movement of the virtual 3D hands. (Act 208) For example, the Interaction Engine identifies a type of slate virtual interaction based on selection by the virtual 3D hands of a slate virtual interaction option from a displayed AR menu.

The Interaction Engine modifies the AR display, via the AR headset device, by rendering a virtual slate in the AR display concurrently displayed, at a first display position, with the virtual 3D medical model. In some embodiments, the virtual slate is an AR touchpad. (Act 210)

The Interaction Engine detects a second physical gesture with respect to the virtual slate. (Act 212) For example, the Interaction Engine determines a display position for a handle. In various embodiments, the handle may have a display position overlayed upon the virtual slate. The handle display position may be based on a projection of a display position of an index finger portion of a virtual 3D hand.

The Interaction Engine modifies the AR display by adjusting the display of the virtual 3D medical model based at least one or more subsequent physical gestures with respect to the virtual slate. (Act 214) As the Interaction Engine detects the subsequent physical gestures, the display position of the index finger portion of the virtual 3D hands changes accordingly. The Interaction Engine further updates the display position of the handle in accordance with projection(s) from the changed display position of the index finger portion. In various embodiments, each handle display position may further be an instance of an input command (or part of an input command) applied to the virtual slate.

Figure 3:
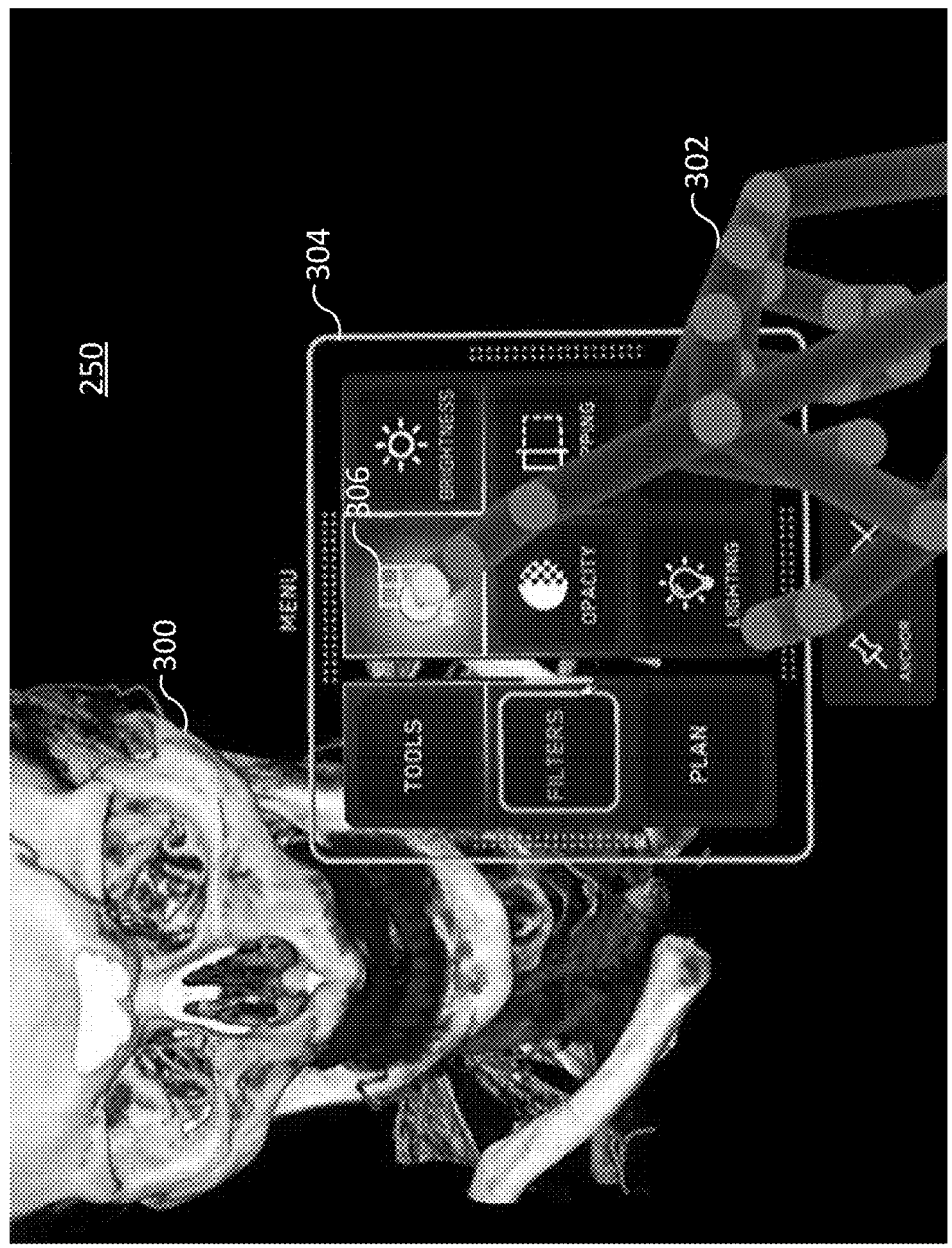
FIG. 3 is a diagram illustrating an exemplary environment in which some embodiments may operate.

As shown in FIG. 3, the Interaction Engine detects selection of windowing slate virtual interaction ("windowing slate interaction") option 306 from a menu 304 displayed in an AR display 250. The menu 304 is concurrently displayed in the AR display 250 with a rendering of a 3D virtual medical model 300.

It is understood that the windowing slate interaction described herein may be based, at least in part on—or correspond with—various embodiments of a windowing virtual interaction described in U.S. patent application Ser. No. 17/194,191.

Figure 4:
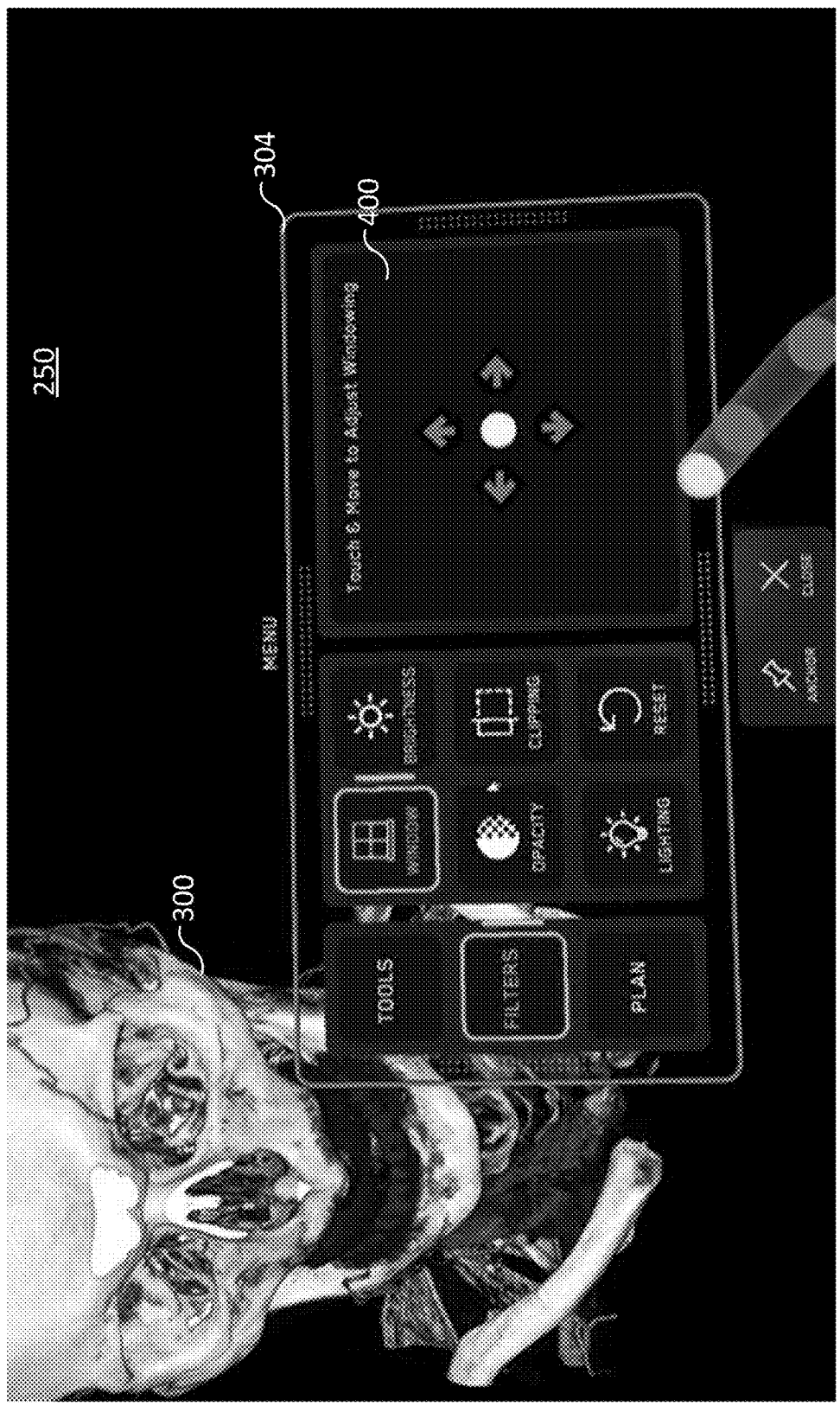
FIG. 4 is a diagram illustrating an exemplary environment in which some embodiments may operate.

As shown in FIG. 4, based on the selection of the option 306, the Interaction Engine adjusts the display of the menu 304 in the AR display 250 to include a 3D virtual slate 400. According to some embodiments, the 3D virtual slate is an AR touchpad ("touchpad"). In some embodiments, the virtual slate 400 may be displayed as a section of the menu 304. In some embodiments, the virtual slate 400 may displayed as a distinct AR virtual obkect in the AR display 250 that is separate from the menu 304.

Figure 5A:
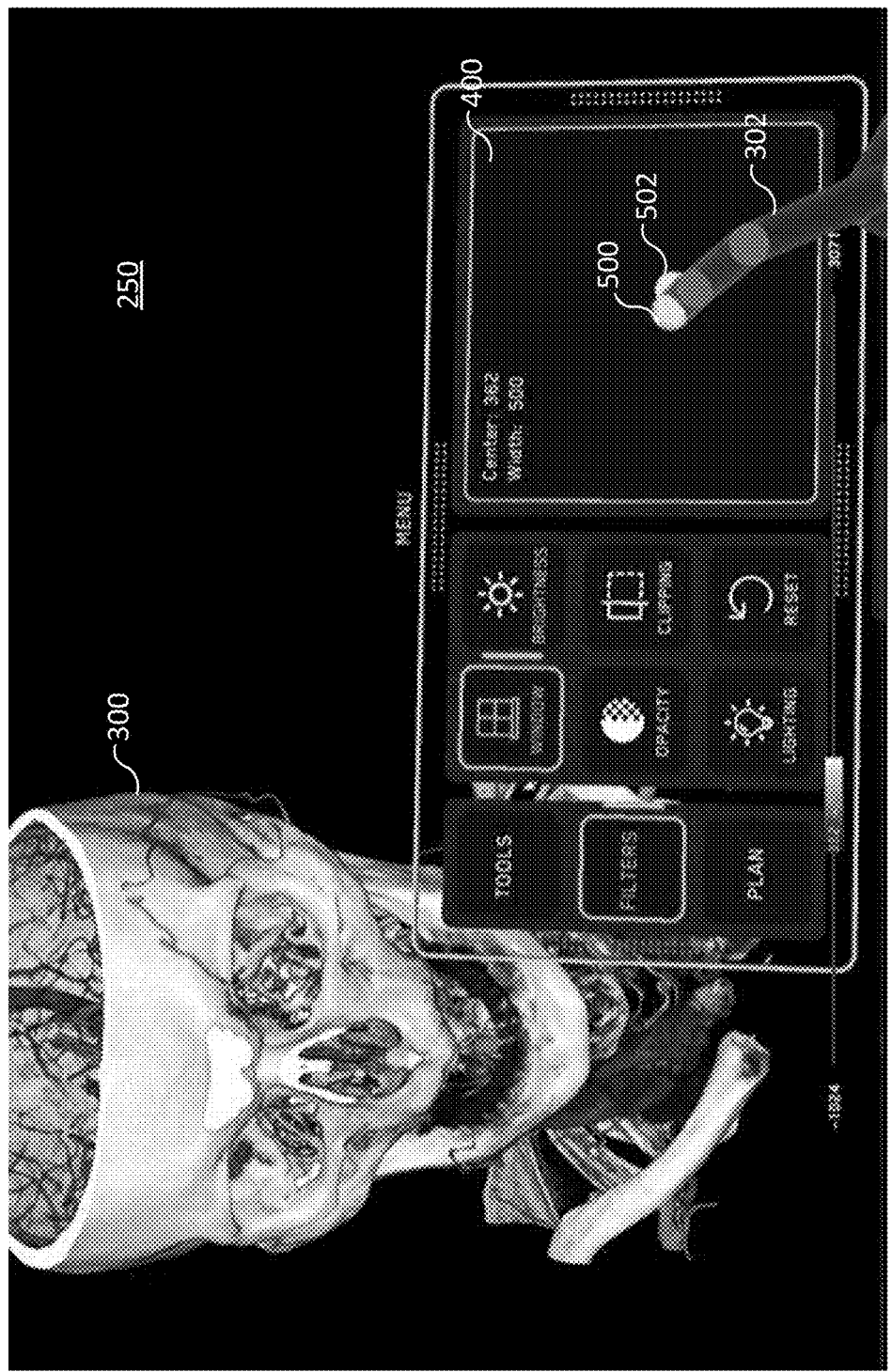
FIGS. 5A and 5B are each a diagram illustrating an exemplary environment in which some embodiments may operate.

As shown in FIG. 5A, the Interaction Engine displays a handle 502 overlayed upon the virtual slate 400. The Interaction Engine determines a display position for the handle 502 based on a projection of a display position of an index finger portion 500 of the virtual hand representation 302 (i.e. a virtual 3D hand). The Interaction Engine determines the display position of the index finger portion 500 based at least in part on a current position and orientation of the virtual hand representation 302. The Interaction Engine identifies coordinates in the unified 3D coordinate space that correspond to coordinates of the virtual slate's 400 current position and orientation. The Interaction Engine projects the index finger portion's 500 display position onto the identified virtual slate coordinates to determine the display position for the handle 502.

Figure 5B:

As shown in FIG. 5B, the Interaction Engine detects one or more subsequent physical gestures. For example, the physical gestures result in horizontal movement of the virtual hand representation 302. The Interaction Engine further updates the display position of the handle 502 in accordance with the horizontal movement. Based on determining horizontal directional data for the horizontal movement, the Interaction Engine adjusts display of a window bar 504 concurrently displayed in the AR display.

According to various embodiments, the window bar 504 represents a range of voxel values (such as a selected range of voxel intensity values). The Interaction Engine assigns each respective color shade in a color gradient palette to a corresponding voxel value that falls within the range represented in the window bar 504. In some embodiments, the color gradient palette may be a black and white color gradient palette that includes all intermediary shades of black, white and gray.

The Interaction Engine identifies various portions of the 3D medical model data that have respective voxel values that fall the within range represented in the window bar 504. The Interaction Engine generates display of a medical model window 506 in the AR display 250. The medical model window 506 portrays a rendering of the identified 3D medical model data.

The Interaction Engine renders each identified portion of the 3D medical model data (i.e. data with voxel values in the range represented in the window bar 504) according to the color gradient palette. For example, if an identified portion of the 3D medical model data has a voxel value that is assigned a particular shade of gray in the window bar 504, the Interaction Engine thereby renders that identified portion of the 3D medical model data in the AR display 250 according to the assigned particular shade of gray. If another identified portion of the 3D medical model data has a voxel value that is assigned a particular shade of white in the window bar 504, the Interaction Engine thereby renders that other identified portion of the 3D medical model data in the AR display 250 according to the assigned particular shade of white.

As further shown in FIG. 5B, the Interaction Engine detects directional data that corresponds to a physical gesture. The Interaction Engine renders the virtual representation of the hand 302 and the handle 502 in accordance with the directional data. For example, the Interaction Engine renders and displays, in the AR display 250, the virtual representation of the hand 302 and the handle 502 as moving horizontally.

The Interaction Engine adjusts a center of the window bar 504 based on the horizontal directional data. For example, the window bar 504 may have a display position along a full range of possible voxel values 506. For example, the full range of possible voxel values 506 may be from −1024 to 3071. The range of the window bar 504 represents a selected range of voxel values between −1024 to 3071. The range may further have a central voxel value. For example, the central voxel value may be voxel value that is at the midpoint of the range of the window bar 504.

The Interaction Engine adjusts the display position of the window bar 504 by moving display of the window bar 504 to the right or left along the full range of possible voxel values 506. For leftward horizontal directional data, the Interaction Engine adjusts the display position of the window bar 504 by moving the central voxel value of the range of the window bar 504 to the left and closer to the terminus voxel value of −1024. For rightward horizontal directional data, the Interaction Engine adjusts the display position of the window bar 504 by moving the central voxel value of the range of the window bar 504 to the right and closer to the terminus voxel value of 3071.

The Interaction Engine detects the extent of the horizontal directional data to determine the extent of an absolute value change of the central voxel value. For example, the Interaction Engine may determine that leftward horizontal directional data results in the central voxel value (of the range of the window bar 504) to be shifted leftward by 15 voxel values. In addition, the Interaction Engine further determines that all other voxel values in the range are thereby to be decremented by 15 voxel values as well. For example, the Interaction Engine may determine that rightward horizontal directional data results in the central voxel value to be shifted rightward by 30 voxel values. In addition, the Interaction Engine further determines that all other voxel values in the range are thereby to be incremented by 30 voxel values.

Figure 6:
FIG. 6 is a diagram illustrating an exemplary environment in which some embodiments may operate.

As shown in FIG. 6, the Interaction Engine adjusts a length of the window bar 504 based on detecting vertical directional data. In various embodiments, the Interaction Engine detects the extent of the vertical directional data to determine the extent of a change of the length of the window bar 504. For example, the Interaction Engine may determine that upward vertical directional data results in increasing the range of the window bar 504 to include an additional 40 voxel values. For example, the Interaction Engine may determine that downward vertical directional data results in decreasing the range of the window bar 504 to no longer include 100 voxel values that we part of the range prior to detection of the downward vertical directional data.

In various embodiments, the Interaction Engine adjusts the length of the window bar 504 by concurrently modifying terminus values of the range of the window bar 504. For example, the Interaction Engine includes 40 additional voxel values in response to the upward vertical directional data by concurrently extending both the highest and the lowest voxel values of the range of the window bar 504 by 20 voxel values. For example, the Interaction Engine removes 100 voxel values in response to the downward vertical directional data by concurrently decreasing both the highest and the lowest voxel values of the range of the window bar 504 by 50 voxel values.

As shown in FIG. 7, the Interaction Engine defines a 3D virtual slate object ("virtual slate object"). For example, the virtual slate object may be defined according to a 3D box shape. The virtual slate object includes the virtual slate 400 and a posterior surface 400-1. The virtual slate 400 and the posterior surface 400-1 are separated by a particular distance. In some embodiments, the Interaction Engine renders only the virtual slate 400 in the AR display 250 and does not render any other portions of the virtual slate object (such as the posterior surface 400-1).

The Interaction Engine defines and implements the virtual slate object in order to determine when to maintain display of the handle 502 as overlayed upon the virtual slate 400. The Interaction Engine maintains display of the handle 502 based on projection of a current orientation and position of the index finger portion of the 3D virtual hand while the Interaction Engine detects the current orientation and position of the 3D virtual hand situates 3D virtual hand within boundaries of the virtual slate object.

For example, the virtual slate object may boundaries with positional coordinates based on a current position and orientation of the virtual slate 400. When the Interaction Engine determines that a current orientation and position of the 3D virtual hand results in a portion of the 3D virtual hand exceeding any boundary of the virtual slate object, the Interaction Engine terminates display of the handle 502.

Figure 7A:
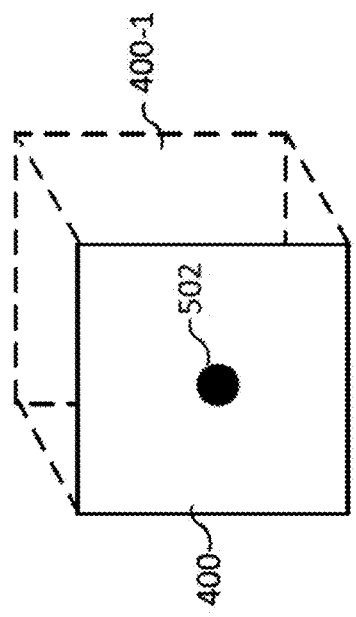
FIGS. 7A and 7B are each a diagram illustrating an exemplary environment in which some embodiments may operate.
Figure 7B:
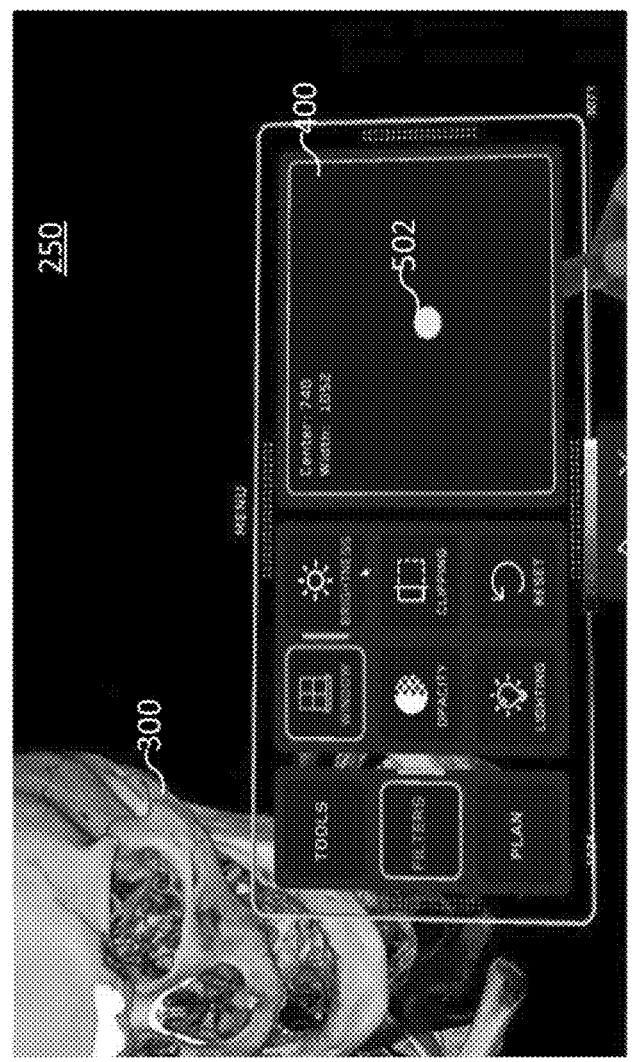

As show in FIG. 7B, a current orientation and position of the 3D virtual hand corresponds to a display position that is past a current display position of the virtual slate 400. The Interaction Engine maintains display of the handle 502 until the Interaction Engine determines that a portion of the 3D virtual hand exceeds a boundary of the virtual slate object.

Figure 8A:
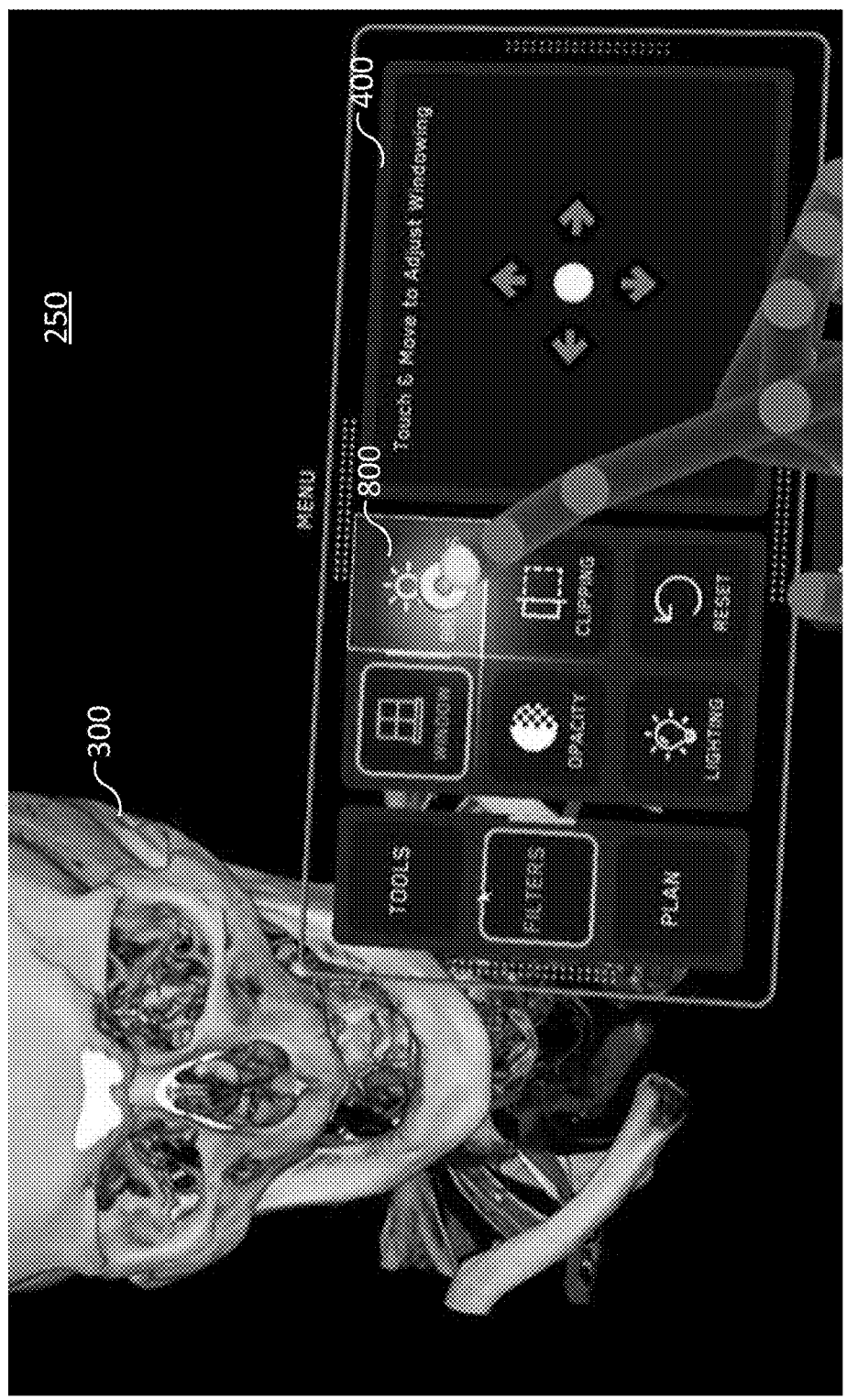
FIGS. 8A, 8B and 8C are each a diagram illustrating an exemplary environment in which some embodiments may operate.

As shown in FIG. 8A, the Interaction Engine detects selection of a brightness slate virtual interaction ("brightness slate interaction") 800.

Figure 8B:
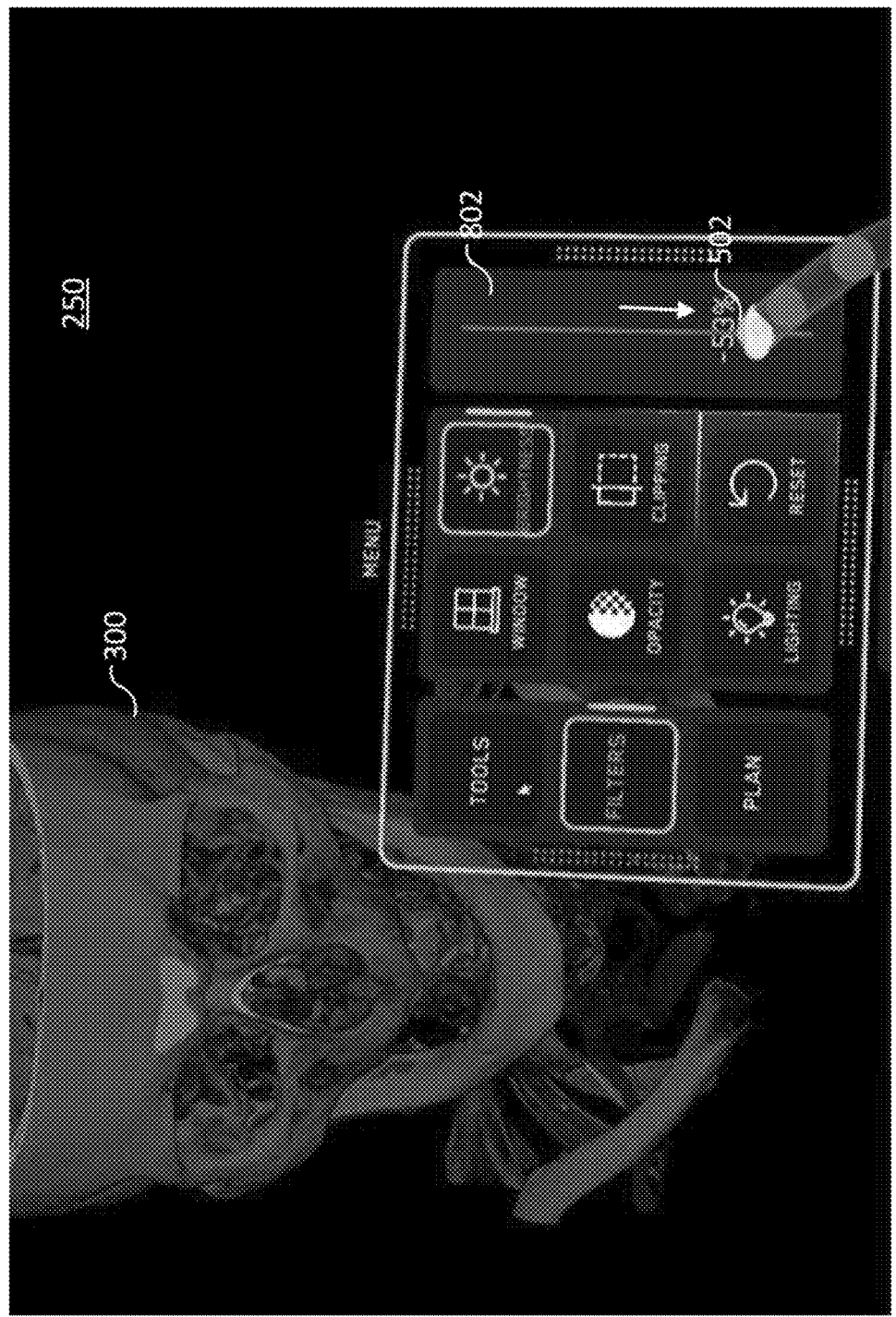

As shown in FIG. 8B, the Interaction Engine displays a brightness touchpad 802 based on the selection of the brightness slate virtual interaction 800. The Interaction Engine adjusts a brightness factor applied to the voxel values of the 3D virtual medical model 300 currently displayed in the AR display 250. In various embodiments, the Interaction Engine may determine that downward vertical directional data corresponds to an amount of a decrease in the brightness factor.

Figure 8C:

As shown in FIG. 8C, the Interaction Engine may determine that upward vertical directional data corresponds to an amount of an increase in the brightness factor.

Figure 9A:
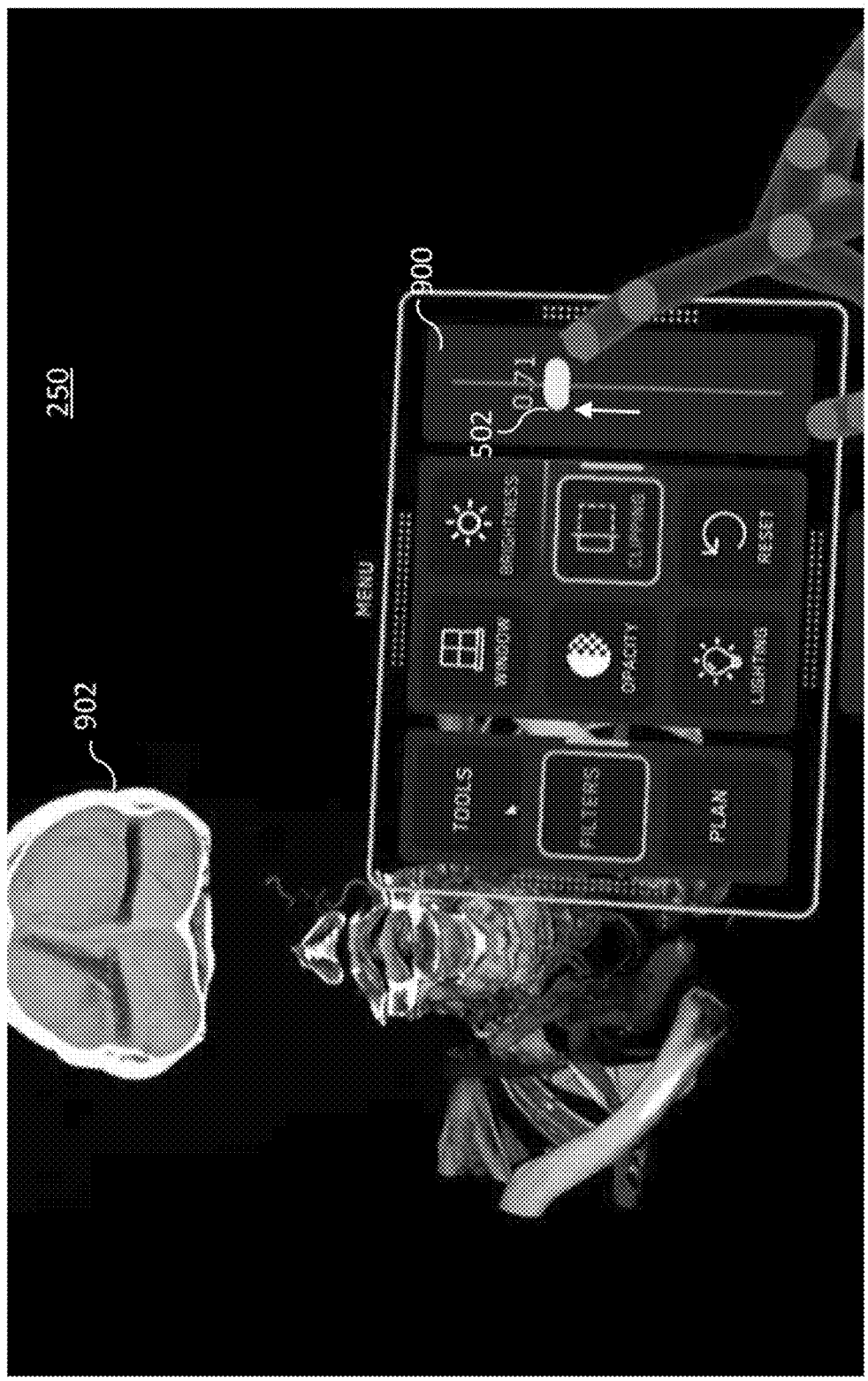
FIGS. 9A and 9B are each a diagram illustrating an exemplary environment in which some embodiments may operate.

According to various embodiment, the Interaction Engine detects selection of a clipping plane slate virtual interaction ("clipping plane slate interaction"). As shown in FIG. 9A, the Interaction Engine displays a clipping plane touchpad 802 based on the selection of the clipping plane slate interaction. In some embodiments, the clipping plane may not be rendered by the Interaction Engine and not displayed in the AR display 250. It is understood that the clipping plane slate interaction described herein may be based, at least in part on—or correspond with—various embodiments of a clipping plane virtual interaction described in U.S. patent application Ser. No. 17/194,191.

According to various embodiments, the Interaction Engine determines that a clipping plane intersects the 3D virtual medical model 300 and results in a clipped 3D virtual medical model 902 ("clipped medical model") displayed in the AR display 250 due to a position of the clipping plane. The Interaction Engine identifies portions of the clipping plane that overlap with the 3D virtual medical model 300 in a current model pose.

According to various embodiments, the Interaction Engine determines medical model data for the 3D virtual medical model 300 in its current model pose, whereby the medical model data represents medical model data 604 that maps to one or more of the positional coordinates of the clipping plane. For example, the Interaction Engine identifies medical model data that represents both external and internal anatomical regions. The Interaction Engine updates the AR display 250 to include display of the clipped medical model 902 to include portrayal of the identifies medical model data.

As further shown in FIG. 9A, the Interaction Engine may represent movement by the clipping plane based on upward vertical directional data. In one or more embodiments, a current position of the clipping plane may be adjusted by the Interaction Engine based on an extent of upward vertical directional data. For example, the current position of the clipping plane may be adjusted to increase a distance between the position of the clipping and a current position and orientation of the AR headset device.

Figure 9B:
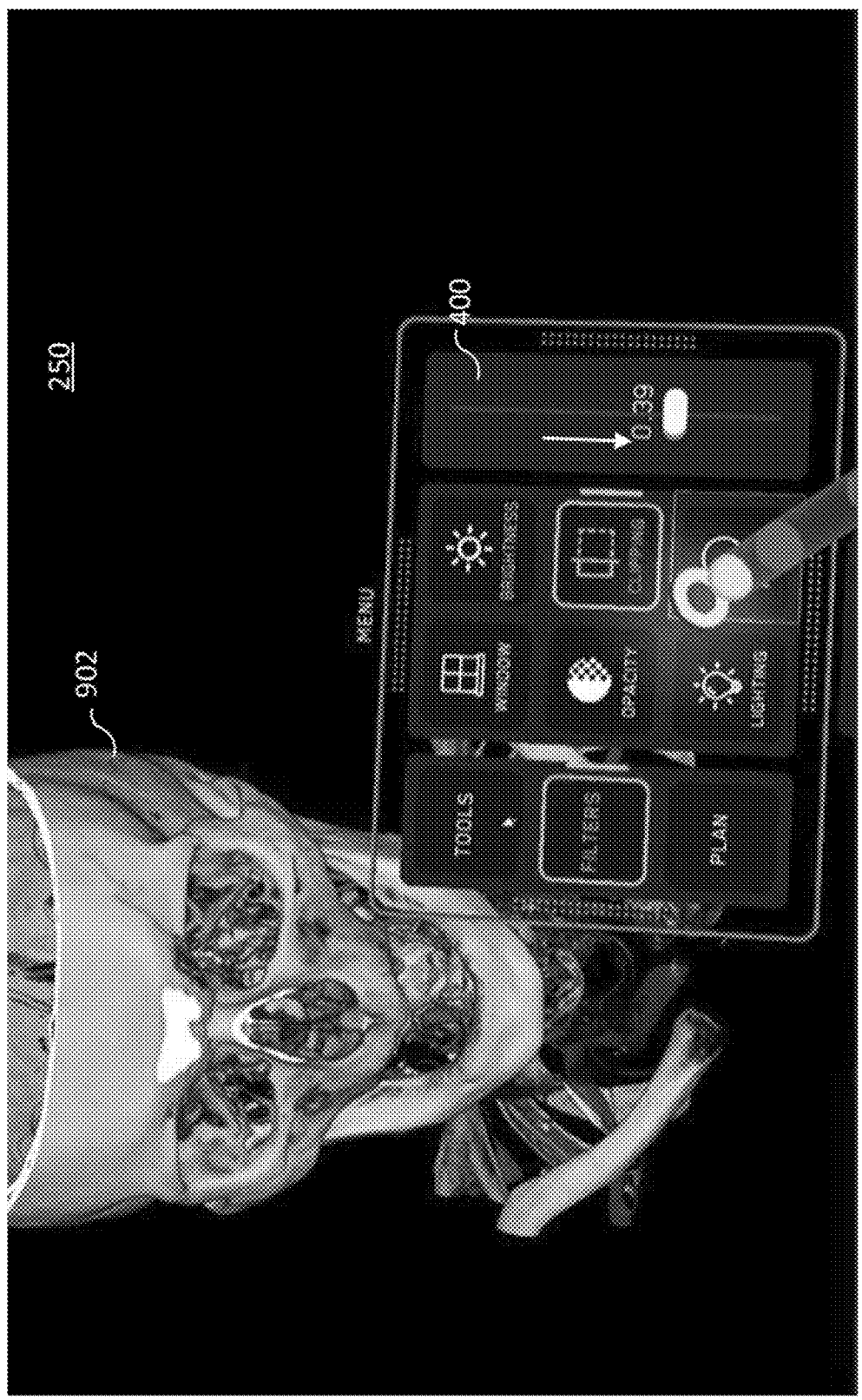

As shown in FIG. 9B, the Interaction Engine may represent movement by the clipping plane based on downward vertical directional data. In various embodiments, the current position of the clipping plane may be adjusted by the Interaction Engine based on an extent of downward vertical directional data. For example, the current position of the clipping plane may be adjusted to decrease the distance between the position of the clipping and a current position and orientation of the AR headset device.

Figure 10A:
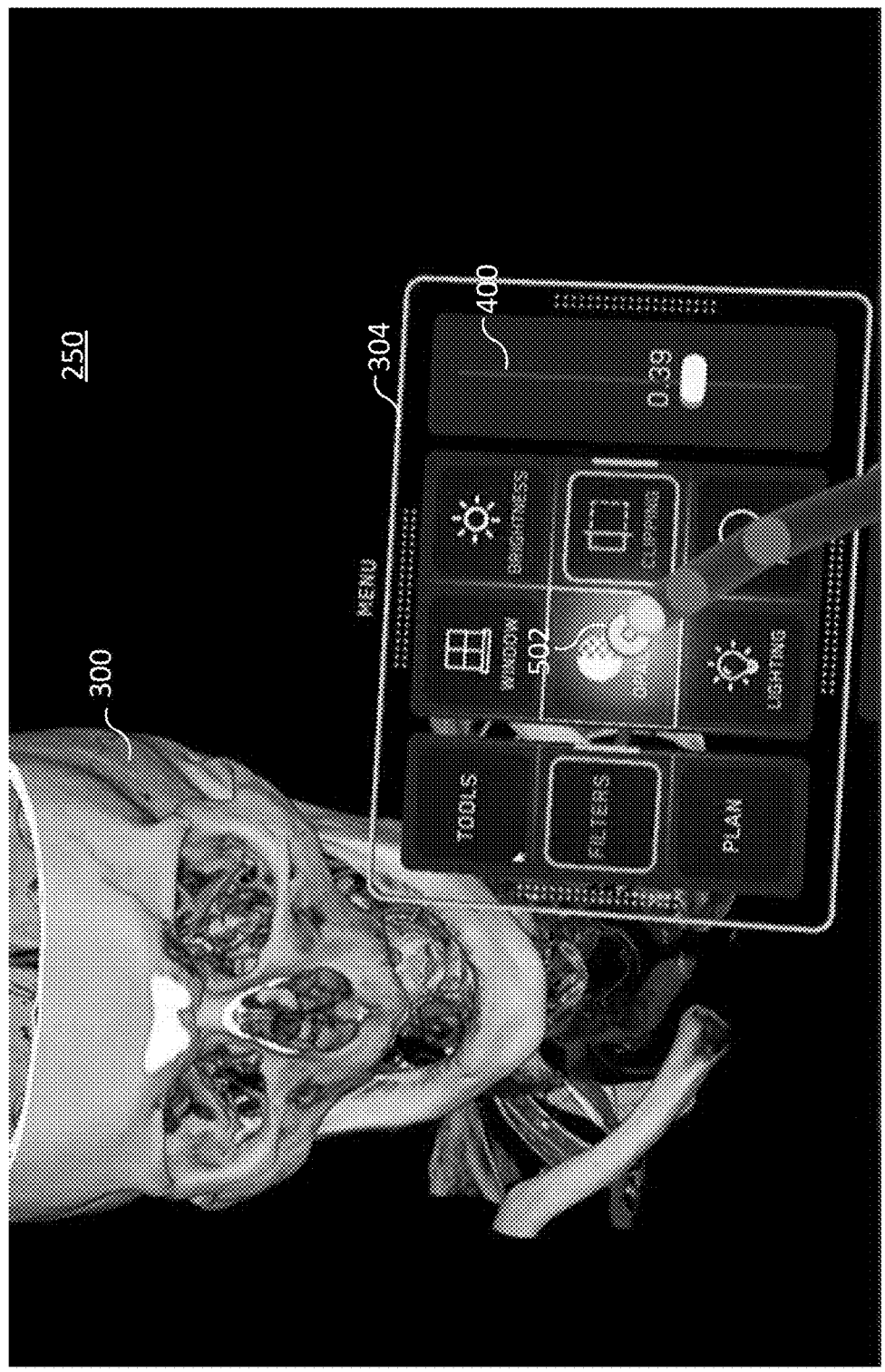
FIGS. 10A, 10B and 10C is a diagram illustrating an exemplary environment in which some embodiments may operate.

As shown in FIG. 10A, the Interaction Engine detects selection of an opacity slate virtual interaction ("opacity slate interaction") option from the menu 304.

Figure 10B:
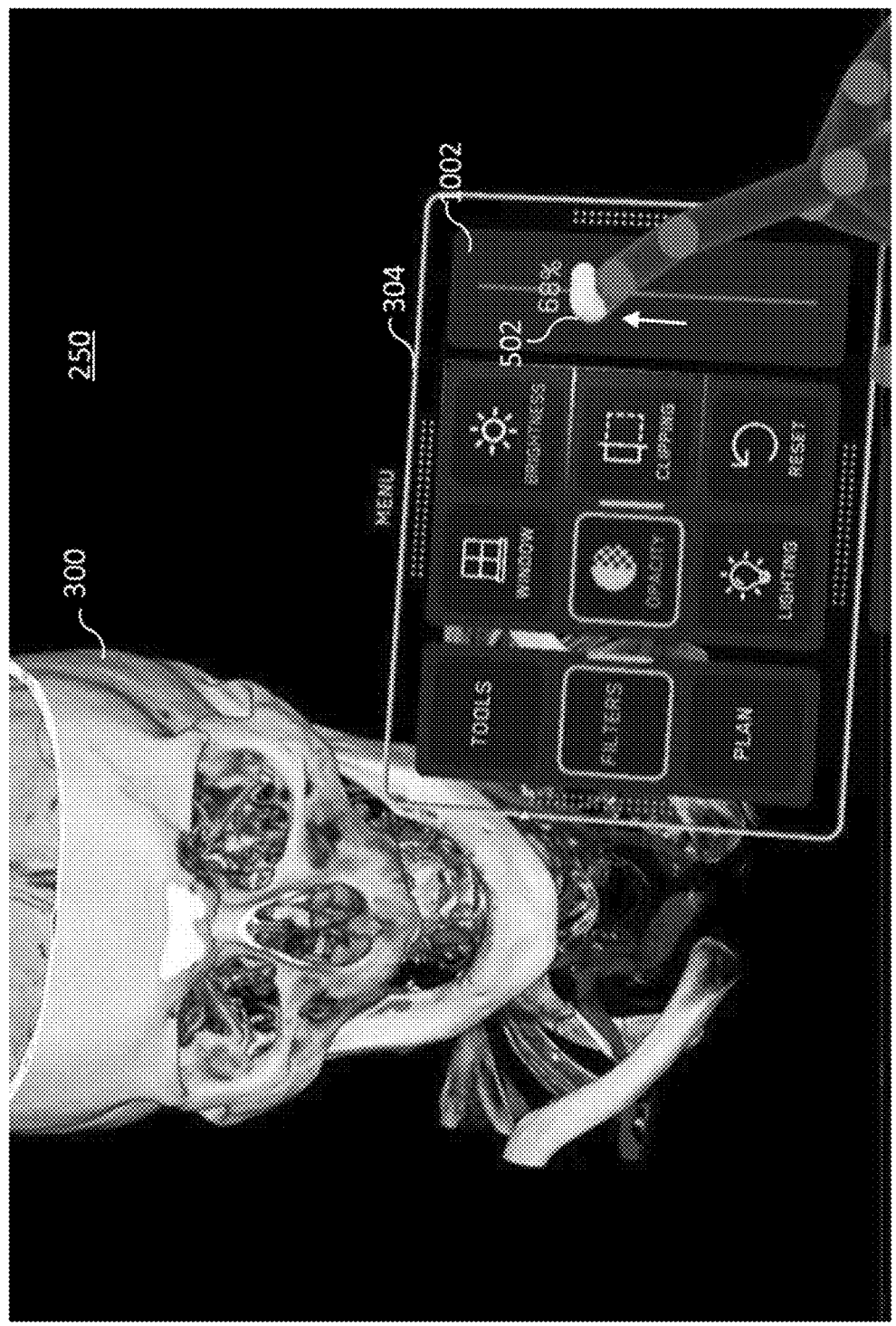

As shown in FIG. 10B, the Interaction Engine displays an opacity touchpad 1002 based on the selection of the brightness slate virtual interaction option. The Interaction Engine adjusts an opacity factor applied to the voxel values of the 3D virtual medical model 300 currently displayed in the AR display 250. In various embodiments, the Interaction Engine may determine that upward vertical directional data corresponds to an amount of an increase in the opacity factor, thereby decreasing a level of transparency of the rendered 3D virtual medical model 300.

Figure 10C:
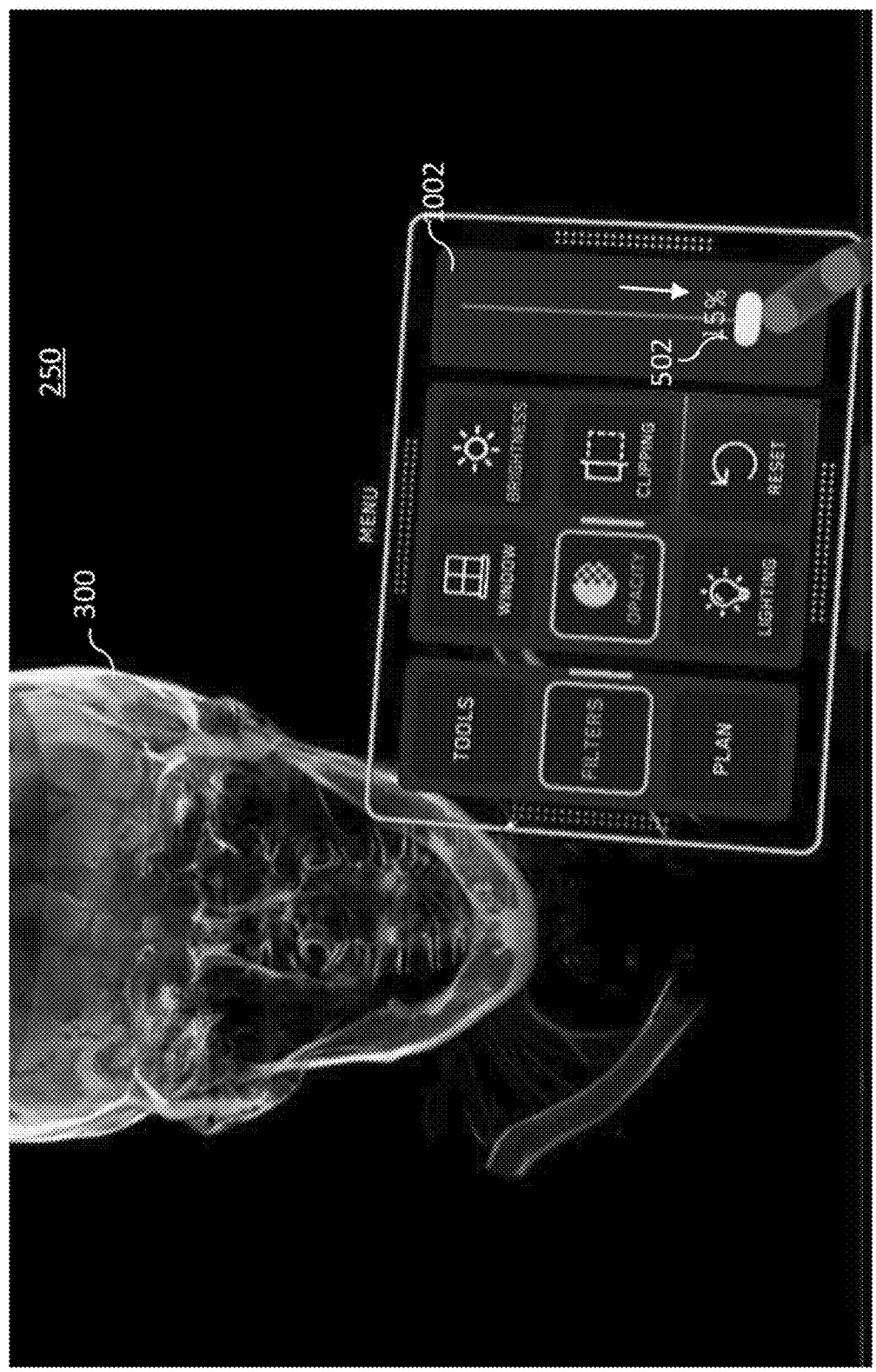

As shown in FIG. 10C, the Interaction Engine may determine that downward vertical directional data corresponds to an amount of a decrease in the opacity factor, thereby increasing a level of transparency of the rendered 3D virtual medical model 300.

Figure 11:
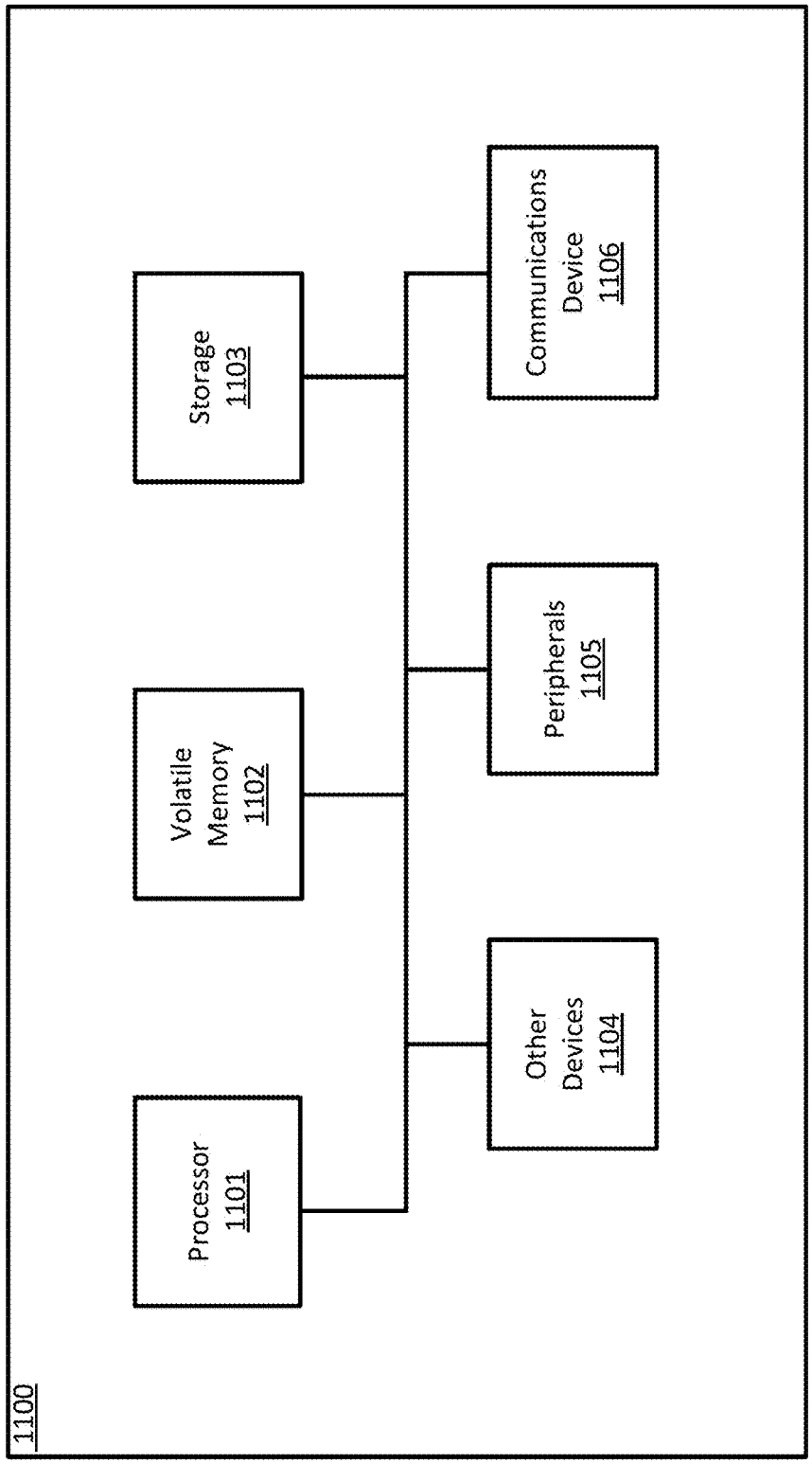
FIG. 11 is a diagram illustrating an exemplary environment in which some embodiments may operate.

FIG. 11 illustrates an example machine of a computer system within which a set of instructions, for causing the machine to perform any one or more of the methodologies discussed herein, may be executed. an exemplary computer 1100 may perform operations consistent with some embodiments. The architecture of computer 1100 is exemplary. Computers can be implemented in a variety of other ways. A wide variety of computers can be used in accordance with the embodiments herein.

Processor 1101 may perform computing functions such as running computer programs. The volatile memory 1102 may provide temporary storage of data for the processor 1101. RAM is one kind of volatile memory. Volatile memory typically requires power to maintain its stored information. Storage 1103 provides computer storage for data, instructions, and/or arbitrary information. Non-volatile memory, which can preserve data even when not powered and including disks and flash memory, is an example of storage. Storage 1103 may be organized as a file system, database, or in other ways. Data, instructions, and information may be loaded from storage 1103 into volatile memory 1102 for processing by the processor 1101.

The computer 1100 may include peripherals 1105. Peripherals 1105 may include input peripherals such as a keyboard, mouse, trackball, video camera, microphone, and other input devices. Peripherals 1105 may also include output devices such as a display. Peripherals 1105 may include removable media devices such as CD-R and DVD-R recorders/players. Communications device 1106 may connect the computer 1100 to an external medium. For example, communications device 1106 may take the form of a network adapter that provides communications to a network. A computer 1100 may also include a variety of other devices 1104. The various components of the computer 1100 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

What is claimed is:

1. A computer-implemented method, comprising:
   generating, within a unified three-dimensional (3D) coordinate space:
   (i) a virtual 3D medical model positioned according to a current model pose, the current model pose representing a position and orientation of the virtual 3D medical model in the unified 3D coordinate space; and
   (ii) at least one a virtual 3D hand representation;
   rendering, via an Augmented Reality (AR) headset device, an AR display that includes display of the virtual 3D medical model positioned according to the current model pose and the virtual 3D hand representation;
   detecting a first physical gesture;
   based on the first physical gesture, identifying selection of a type of slate virtual interaction from a plurality of types of slate virtual interactions, each respective type of slate virtual interaction corresponds to a different type of modification applied to the display of the virtual 3D medical model responsive to detection of one or more physical gestures with respect to a virtual slate;
   in response to selection of the type of slate virtual interaction, rendering in the AR display an instance of the virtual slate ("rendered virtual slate") that corresponds with functionality of the selected type of slate virtual interaction, the rendered virtual slate comprising an AR touchpad concurrently displayed, at a first display position, with the virtual 3D medical model;

detecting a second physical gesture with respect to the virtual slate; and modifying the AR display by:
(i) displaying a handle overlay at a first handle display position within the virtual slate, the first handle display position based on a projection of a first position and orientation of the virtual 3D hand representation ("first hand position");
(ii) displaying the handle overlay at a subsequent second handle display position within the virtual slate, the second handle display position based on a projection of a result of a movement from the first hand position to a second position and orientation of the virtual 3D hand representation ("second hand position"); and
(iii) during the movement from the first hand position to the second hand position, concurrently adjusting the display of at least a portion of model data of the virtual 3D medical model, according to the selected type of slate virtual interaction, based at least on an extent of the movement from the first hand position to the second hand position.

2. The computer-implemented method of claim 1, wherein the extent of the modification of the display of the virtual 3D medical model corresponds to respective amounts of one or more types of directional data from the one or more physical gestures with respect to the rendered virtual slate.

3. The computer-implemented method of claim 1, wherein the plurality of types of slate virtual interactions includes at least two of:
(i) a windowing slate interaction;
(ii) an opacity slate interaction;
(iii) a brightness slate interaction; and
(iv) a clipping plane slate interaction.

4. The computer-implemented method of claim 1, wherein detecting a second physical gesture with respect to the virtual slate comprises:
determining the first hand position; and
projecting the handle overlay to the first handle display position, based on the first hand position;
determining the second hand position; and
projecting the handle overlay to the second handle display position, based on the second hand position.

5. The computer-implemented method of claim 1, further comprising:
determining the first hand position, comprising:
determining a position and orientation of an index finger of the virtual 3D hand representation ("index finger position"); and
determining a respective projection of the index finger position, comprising:
projecting the index finger position to a location on the virtual slate;
determining the first handle display position based on projecting the index finger position; and
displaying the handle overlay upon the rendered virtual slate at the first handle display position.

6. A computer-implemented method, comprising:
generating, within a unified three-dimensional (3D) coordinate space:
(i) a virtual 3D medical model positioned according to a current model pose, the current model pose representing a position and orientation of the virtual 3D medical model in the unified 3D coordinate space; and
(ii) at least one a virtual 3D hand representation;
rendering, via an Augmented Reality (AR) headset device, an AR display that includes display of the virtual 3D medical model positioned according to the current model pose and the virtual 3D hand representation;

detecting a first physical gesture;
based on the first physical gesture, identifying selection of a type of slate virtual interaction from a plurality of types of slate virtual interactions, each respective type of slate virtual interaction corresponds to a different type of modification applied to the display of the virtual 3D medical model responsive to detection of one or more physical gestures with respect to a virtual slate;
in response to selection of the type of slate virtual interaction, rendering in the AR display an instance of the virtual slate ("rendered virtual slate") that corresponds with functionality of the selected type of slate virtual interaction, the rendered virtual slate comprising an AR touchpad concurrently displayed, at a first display position, with the virtual 3D medical model;

detecting a second physical gesture with respect to the virtual slate; and modifying the AR display by:
(i) displaying a handle overlay at a first handle display position within the virtual slate, the first handle display position based on a projection of a first position and orientation of the virtual 3D hand representation ("first hand position");
(ii) displaying the handle overlay at a subsequent second handle display position within the virtual slate, the second handle display position based on a projection of a result of a movement from the first hand position to a second position and orientation of the virtual 3D hand representation ("second hand position"); and
(iii) during the movement from the first hand position to the second hand position, concurrently adjusting the display of at least a portion of model data of the virtual 3D medical model, according to the selected type of slate virtual interaction, based at least on an extent of the movement from the first hand position to the second hand position.

7. The system of claim 6 wherein the extent of the modification of the display of the virtual 3D medical model corresponds to respective amounts of one or more types of directional data from the one or more physical gestures with respect to the rendered virtual slate.

8. The system of claim 6, wherein the plurality of types of slate virtual interactions includes at least two of:
(i) a windowing slate interaction;
(ii) an opacity slate interaction;
(i) a brightness slate interaction; and
(ii) a clipping plane slate interaction.

9. The system of claim 6, wherein detecting a second physical gesture with respect to the virtual slate comprises:
determining the first hand position; and
projecting the handle overlay to the first handle display position, based on the first hand position;
determining the second hand position; and
projecting the handle overlay to the second handle display position a display position, based on the second hand position.

10. The system of claim 6, further comprising:
determining the first hand position, comprising:
determining a position and orientation of an index finger of the virtual 3D hand representation ("index finger position"); and
determining a respective projection of the index finger position, comprising:

projecting the index finger position to a location on the virtual slate;
determining the first handle display position based on projecting the index finger position; and
displaying the handle overlay upon the rendered virtual slate at the first handle display position.

11. The system of claim 6, further comprising:
in response to selection of a different type of slate virtual interaction, updating the rendered virtual slate to correspond with functionality of the selected different type of slate virtual interaction.

12. The system of claim 6, wherein detecting a first physical gesture comprises:
detecting the first physical gesture with respect to a virtual menu, the virtual menu displaying respective selectable portions for one or more of the different type of slate virtual interactions.

13. The system of claim 12, wherein rendering in the AR display the rendered virtual slate further comprises:
expanding the virtual menu; and
displaying the rendered virtual slate inside the expanded virtual menu.

14. A computer program product comprising a non-transitory computer-readable medium having a computer-readable program code embodied therein to be executed by one or more processors, the program code including instructions for:
generating, within a unified three-dimensional (3D) coordinate space:
(i) a virtual 3D medical model positioned according to a current model pose, the current model pose representing a position and orientation of the virtual 3D medical model in the unified 3D coordinate space; and
(ii) at least one a virtual 3D hand representation;
rendering, via an Augmented Reality (AR) headset device, an AR display that includes display of the virtual 3D medical model positioned according to the current model pose and the virtual 3D hand representation;
detecting a first physical gesture;
based on the first physical gesture, identifying selection of a type of slate virtual interaction from a plurality of types of slate virtual interactions, each respective type of slate virtual interaction corresponds to a different type of modification applied to the display of the virtual 3D medical model responsive to detection of one or more physical gestures with respect to a virtual slate;
in response to selection of the type of slate virtual interaction, rendering in the AR display an instance of the virtual slate ("rendered virtual slate") that corresponds with functionality of the selected type of slate virtual interaction, the rendered virtual slate comprising an AR touchpad concurrently displayed, at a first display position, with the virtual 3D medical model;
detecting a second physical gesture with respect to the virtual slate; and
modifying the AR display by:
(i) displaying a handle overlay at a first handle display position within the virtual slate, the first handle display position based on a projection of a first position and orientation of the virtual 3D hand representation ("first hand position"); and
(ii) during the movement away from the first hand position, concurrently adjusting the display of at least a portion of model data of the virtual 3D medical model, according to the selected type of slate virtual interaction, based at least on an extent of the movement.

15. The computer program product of claim 14, further comprising:
in response to selection of a different type of slate virtual interaction, updating the rendered virtual slate to correspond with functionality of the selected different type of slate virtual interaction.

16. The computer program product of claim 14, wherein detecting a first physical gesture comprises:
detecting the first physical gesture with respect to a virtual menu, the virtual menu displaying respective selectable portions for one or more of the different type of slate virtual interactions.

17. The computer program product of claim 16, wherein rendering in the AR display the rendered virtual slate further comprises:
expanding the virtual menu; and
displaying the rendered virtual slate inside the expanded virtual menu.

18. The computer-implemented method of claim 1, wherein adjusting the display of at least a portion of model data of the virtual 3D medical model, according to the selected type of slate virtual interaction, based at least an extent of the movement from the first hand position to the second hand position, comprises at least one of:
increasing one or more visual characteristics of the portion of the model data displayed by a currently rendered instance of the virtual 3D medical model in the AR display;
decreasing one or more of the visual characteristics of the portion of the model data displayed by the currently rendered instance of the virtual 3D medical model in the AR display;
revealing one or more of the visual characteristics of the portion of the model data displayed by the currently rendered instance of the virtual 3D medical model in the AR display; and
revealing one or more of the visual characteristics of the portion of the model data obscured by the currently rendered instance of the virtual 3D medical model in the AR display;
wherein the visual characteristic corresponds to the selected type of slate virtual interaction.

\* \* \* \* \*